US007311160B2

(12) United States Patent
Lim

(10) Patent No.: US 7,311,160 B2
(45) Date of Patent: Dec. 25, 2007

(54) WHEELCHAIR WITH FORCED DRIVEN FRONT CATERPILLAR WHEELS

(76) Inventor: Nag-Bok Lim, 101-1202 Hanjin Apt., 478 Gaebong-dong, Kuro-ku, Seoul 152-756 (KR)

( * ) Notice: Subject to any disclaimer, the term of this patent is extended or adjusted under 35 U.S.C. 154(b) by 173 days.

(21) Appl. No.: 10/517,232

(22) PCT Filed: Jul. 9, 2003

(86) PCT No.: PCT/KR03/01358

§ 371 (c)(1),
(2), (4) Date: Dec. 7, 2004

(87) PCT Pub. No.: WO2004/006823

PCT Pub. Date: Jan. 22, 2004

(65) Prior Publication Data

US 2006/0119078 A1 Jun. 8, 2006

(30) Foreign Application Priority Data

Jul. 13, 2002 (KR) ...................... 10-2002-0041053
Jul. 7, 2003 (KR) ...................... 10-2003-0045909

(51) Int. Cl.
*B62D 55/04* (2006.01)

(52) U.S. Cl. .................... 180/9.26; 180/907; 280/5.22; 280/250.1

(58) Field of Classification Search ................ 180/907, 180/642, 5.22, 250.1, DIG. 10, 304.1, 9.26, 180/9.28, 9.3, 9.32, 8.2; 297/DIG. 4
See application file for complete search history.

(56) References Cited

U.S. PATENT DOCUMENTS 4,044,850 A * 8/1977 Winsor ...................... 180/9.26
4,898,256 A * 2/1990 Lehner ....................... 180/8.2
4,960,180 A * 10/1990 Livingston ................. 180/9.28
5,158,309 A * 10/1992 Quigg ....................... 280/5.22
5,186,269 A * 2/1993 Avakian et al. .............. 180/6.5
5,335,741 A * 8/1994 Rabinovitz et al. .......... 180/8.2
5,423,563 A * 6/1995 Wild ....................... 280/250.1
5,641,030 A * 6/1997 Toselli ....................... 180/9.32
5,651,422 A * 7/1997 Casali ......................... 180/13
6,325,167 B1 * 12/2001 Jiang ......................... 180/9.32
6,408,961 B1 * 6/2002 Chen .......................... 180/6.5
6,604,590 B2 * 8/2003 Foulk, Jr. .................. 180/65.1
6,769,503 B2 * 8/2004 Cheng ....................... 180/68.5
6,805,209 B2 * 10/2004 Hedeen ..................... 180/9.32

FOREIGN PATENT DOCUMENTS

KR 2001-232858 9/2001
KR 2002-266158 2/2002
KR 2002-332361 B1 4/2002

* cited by examiner

*Primary Examiner*—Christopher Bottorff
(74) *Attorney, Agent, or Firm*—Ladas and Parry LLP

(57) ABSTRACT

The present invention relates to a wheelchair with forced driven front caterpillar wheels with a cable-hauling ratchet lever by which a user, by himself/herself, can pass over a road-block or drains on roads, lifts up the caterpillars from the ground for easy steering on caster wheel, engages/disengages the drive wheel having ratchet clutch in the detachable wheel hub to idle the drive wheel/caterpillars for converting from/to manual drive to/from drive by auxiliary power source, and prevents the drive wheel from rolling backward during climbing inclines and controls speed continuously on a slope by a band brake means. So the disabled persons on their legs can travel to outdoors by himself/herself without a care of neighbors.

2 Claims, 6 Drawing Sheets

WHEELCHAIR WITH FORCED DRIVEN FRONT CATERPILLAR WHEELS

TECHNICAL FIELD

The present invention relates to a wheelchair with forced driven front caterpillar wheels. More particularly, the invention relates to a wheelchair by which a driver can readily pass over road blocks or trenches on a road surface by himself/herself, slide down caster and steers on the caster wheels by lifting up the caterpillars from the ground, connect/disconnect the drive wheels to the caterpillars or from an auxiliary power source thereby selectively enabling electrical and/or self propelling manual drive, prevent drive wheels from rolling backward on a ramp by adjusting a clutch controller to which the driver easily accesses.

BACKGROUND ART

A general manual wheelchair of the prior art has a pair of casters which are installed in a front section of a chair body to function as front wheels, and rear wheels which are powered to drive the wheelchair. When a force is applied to steering shafts, the advancing direction of the casters is altered by the rotational force on a radius of rotation defined by the distance between a point on the ground contacted by the each caster and each of the steering shafts so as to facilitate steering even under a relatively small amount of force. On the other hand, when the casters butt into a step side higher than the radius of the caster, a reactive force acts on the caster wheels with a magnitude equal to the advancing force of the wheelchair to interrupt advance of the wheelchair. The wheelchair tends to have small caster wheels to reduce unbalance during climbing up hills. Then, however, the small caster makes it difficult to climb up even small steps on a road. Further, when a user detaches a hand from a drive wheel in order to give another stroke to the drive wheel during uphill climbing, the wheel tends to unbalance rearward. While downhill drive requires successive braking, a wheel contact-type brake system of the prior art hardly allows a good apply of the braking force during the movement of the wheelchair, thereby users palms can be injured.

In the meantime, a wheelchair which has electric power and/or manual drive system and the driver is allowed to be isolated without any assistant person, it is required to be equipped with clutches operated by the driver which enables disengaging the auxiliary power source in order to idle the drive wheel for manual drive for safety concern.

DISCLOSURE OF THE INVENTION

Therefore, the present invention has been made in view of the foregoing problems, and it is an object of the invention to provide a manual wheelchair which is equipped with a couple of caterpillars, clutches contained in drive wheel hubs, a caster sliding up and down, combined control devices of clutches and caster positions, and a couple of band brakes. The caterpillar is consisting of plural wheels linked together by a flexible link belt forming a guide track with an approach angle and is driven by the force transmitted from drive wheel or auxiliary power source so it enables the link belts to pass over higher obstacles, steps, drains or soft and wet soil on its way and gap between platform and subway train floor. However it is difficult to steer the caterpillar tracks because of a long friction face with ground, the caterpillar is lifted up during steering and indoor operation by sliding down the caster which is movable up and down. The clutches contained in drive wheel hubs each have functions of connecting/disconnecting the drive wheels to the caterpillars and/or from an auxiliary power source thereby selectively enabling electrical or self propelling manual driving, and preventing drive wheels from rolling rearward on a ramp by pushing and pulling lever of a clutch controller which is easily accessible to the driver. The band brake works against a drum on a sprocket associated with a wheel hub in order to obtain a continuous braking force during descending on a downhill. And selectively enabling electrical and/or self propelling manual driving modes of the wheelchair save the energy of the driver. So the wheelchair of the invention can help the driver to move more easily and safely by himself/herself without carers over an outdoor road on which driver may confront obstacles such as steps, drains and potholes, soft and wet soil, up and down inclines and gaps between platforms and subway train floors.

BRIEF DESCRIPTION OF THE DRAWINGS

The accompanying drawings incorporated in the specification and constituting a part thereof will illustrate preferred embodiments of the invention and describe the principle of the invention in conjunction with the following detailed description of the preferred embodiments, in which.

BEST MODE FOR CARRYING OUT THE INVENTION

Figure 1:
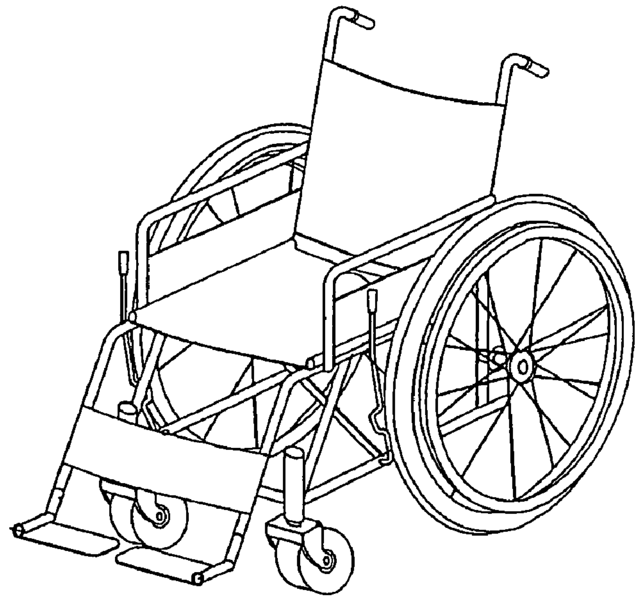
FIG. 1 PRIOR ART
FIG. 1 is a perspective view of a wheelchair of the prior art.
Figure 2A:
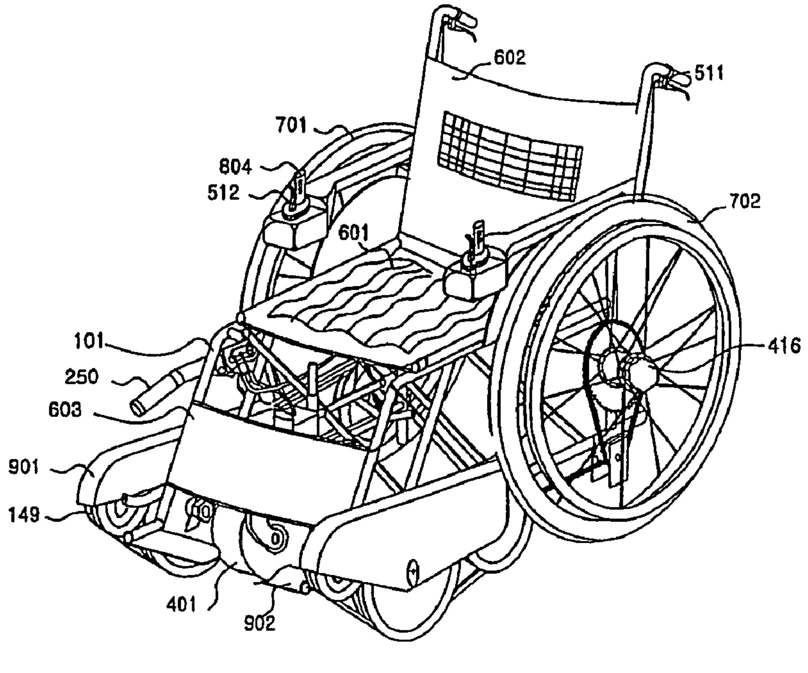
FIG. 2A is a perspective view of a wheelchair having a foldable chair body according to a preferred embodiment of the invention.
Figure 2B:
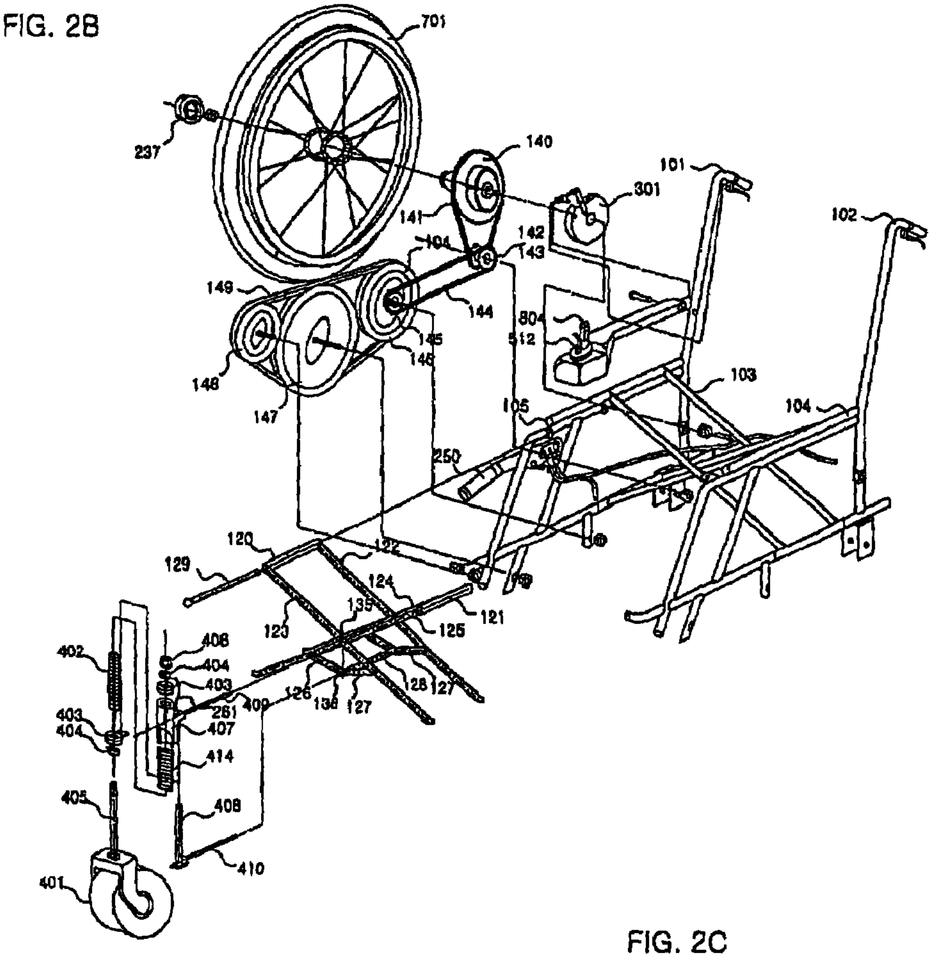
FIG. 2B is an exploded view of the wheelchair having a foldable chair body according to a preferred embodiment of the invention.
Figure 2C:
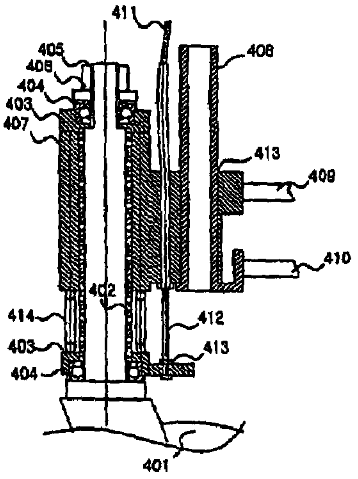
FIG. 2C is a sectional view of an sliding up and down caster according to a preferred embodiment of the invention.
Figure 2D:
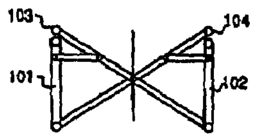
FIG. 2D is a front elevation view of an X-shaped frame for supporting a seat in a foldable chair body of the prior art.
Figure 2E:
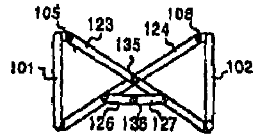
FIG. 2E is a front elevation view of an X-shaped frame for a caster in the chair body according to a preferred embodiment of the invention.
Figure 2F:
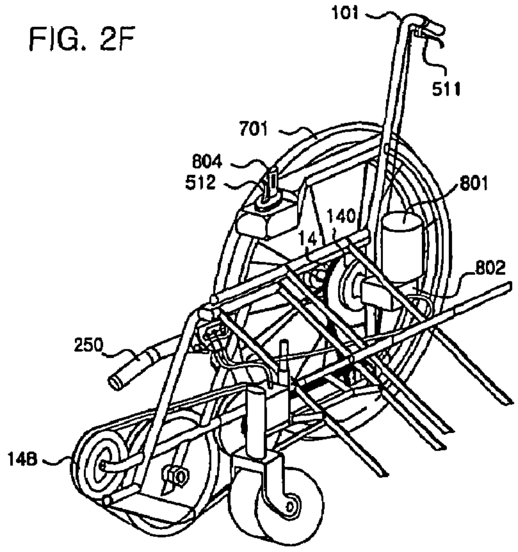
FIG. 2F is a perspective view of a right section of the foldable chair body according to a preferred embodiment of the invention.
Figure 2G:
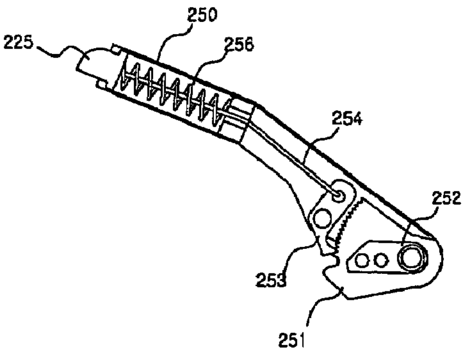
FIG. 2G is a sectional view of a cable-hauling ratchet according to a preferred embodiment of the invention.
Figure 3:
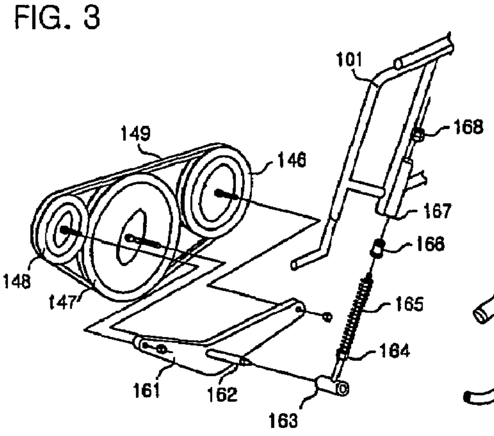
FIG. 3 is a perspective view of a caterpillar according to an alternative embodiment of the invention.

Hereinafter preferred embodiments of the invention will be described in reference to the accompanying drawings.

The present invention generally comprises symmetric left and right chair frame sections 101 and 102, foldable X-shaped frame sections 103 and 104 of the prior art for supporting a seat, foldable X-shaped frame sections 120 and 121 of the invention for supporting a caster, caterpillars 149, a sliding caster 401, a ratchet 250 for hauling a cable, rear drive wheels 701 and 702, wheel hub clutches 201, drive sprocket wheels 140, first and second power transmitting sprocket wheels 142 and 143, a plurality of flexible power transmitting belts 141 and 144, a safety cover 901, band brake 513*s*, brake handles 512, a battery (not shown), a motor 801, a decelerator 802, a driving control lever 804, an electric panel board means (not shown) and other parts.

Figure 4:
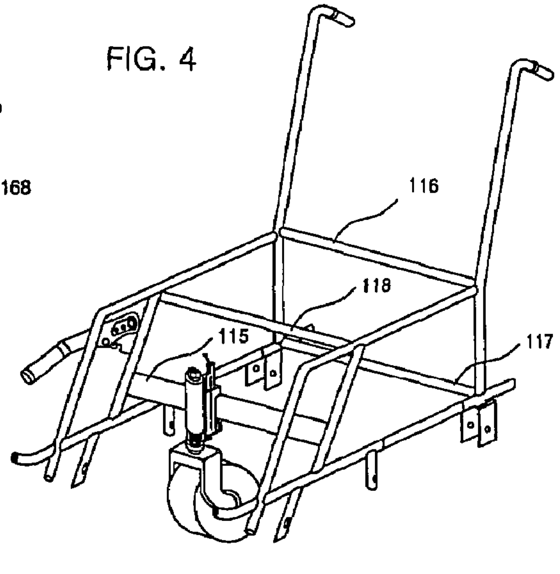
FIG. 4 is a perspective view of a unitary body frame according to another alternative embodiment of the invention.
Figure 5:
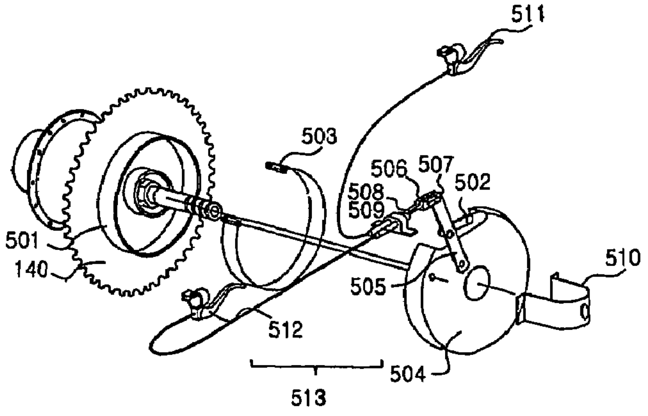
FIG. 5 is a perspective view of a drum brake unit according to a preferred embodiment of the invention.
Figure 6A:
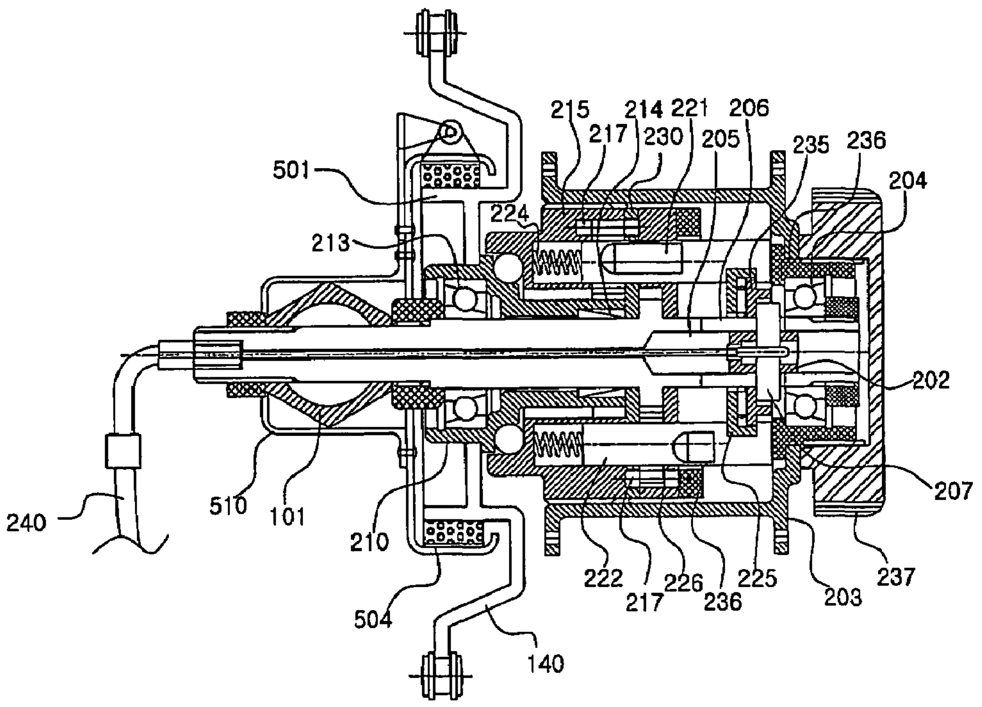
FIG. 6A is a sectional view of a ratchet clutch mounted with a wheel hub according to a preferred embodiment of the invention.
Figure 6B:
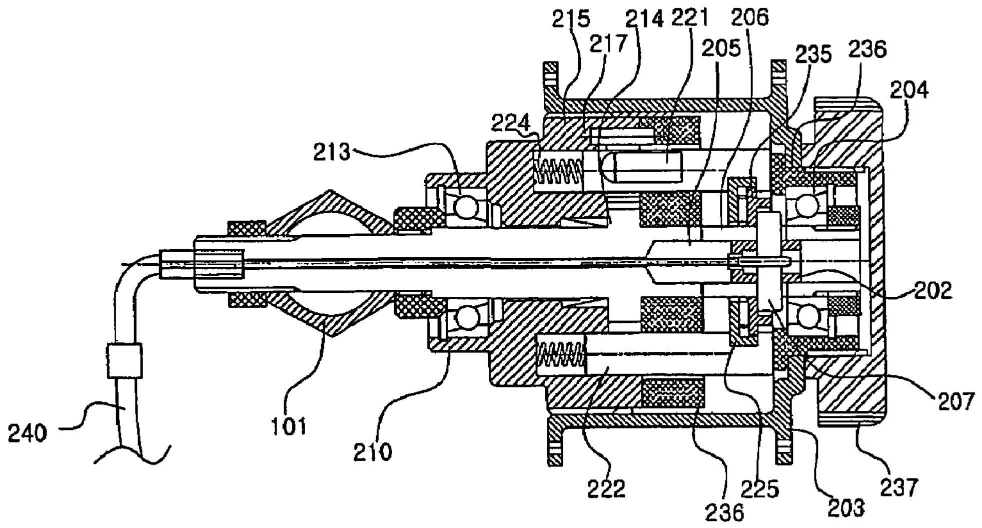
FIG. 6B is a sectional view of a ratchet clutch mounted with a wheel hub according to an alternative embodiment of the invention.
Figure 6C:
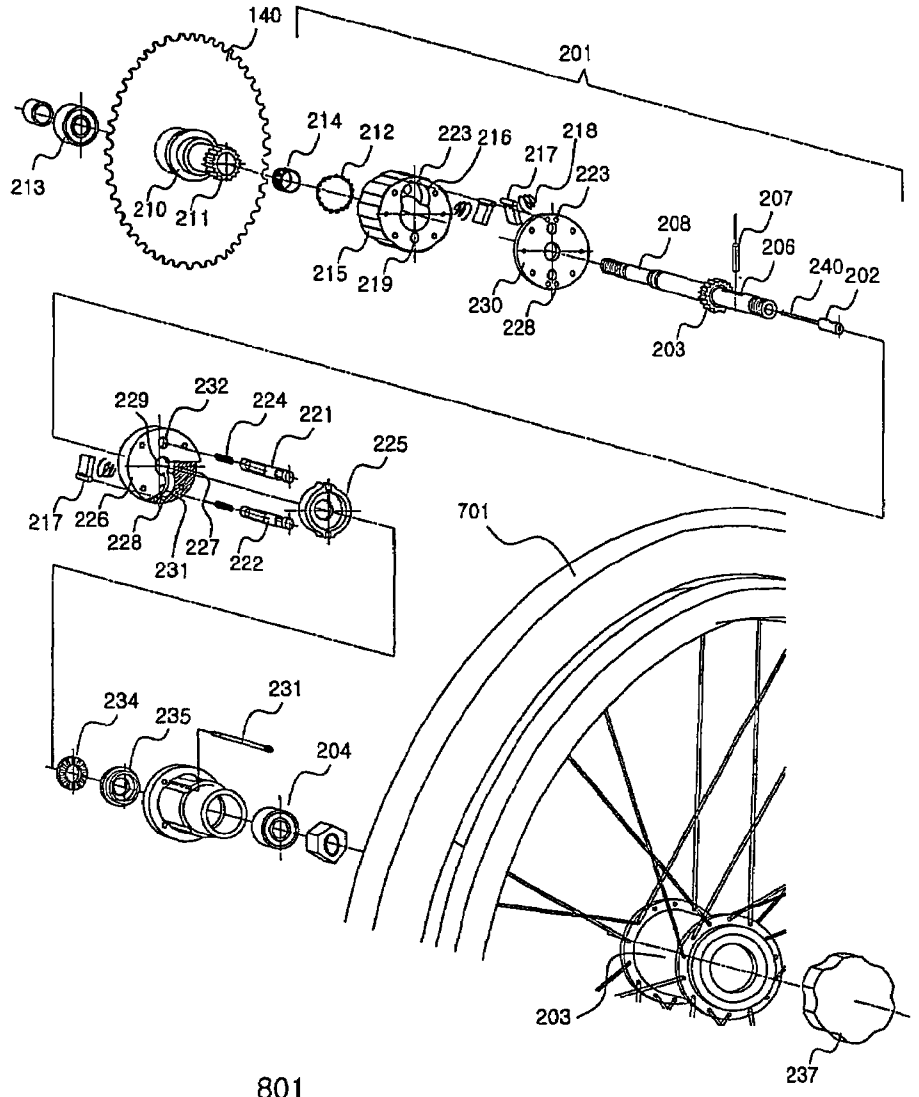
FIG. 6C is an exploded perspective view of the ratchet clutch mounted with a wheel hub according to the preferred embodiment of the invention.
Figure 6D:
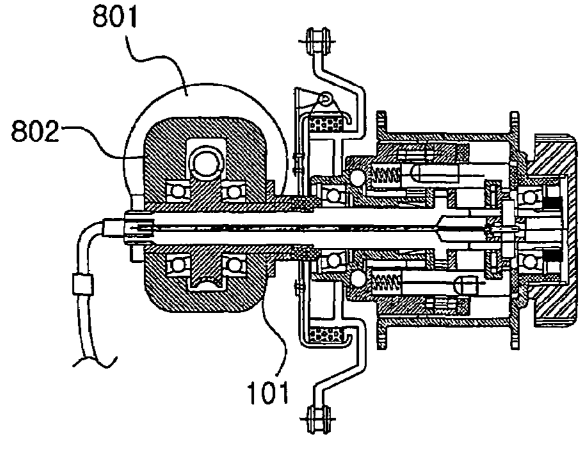
FIG. 6D is a sectional view of the ratchet clutch mounted with wheel hub having electric power source according to another alternative embodiment of the invention.
Figure 6E:
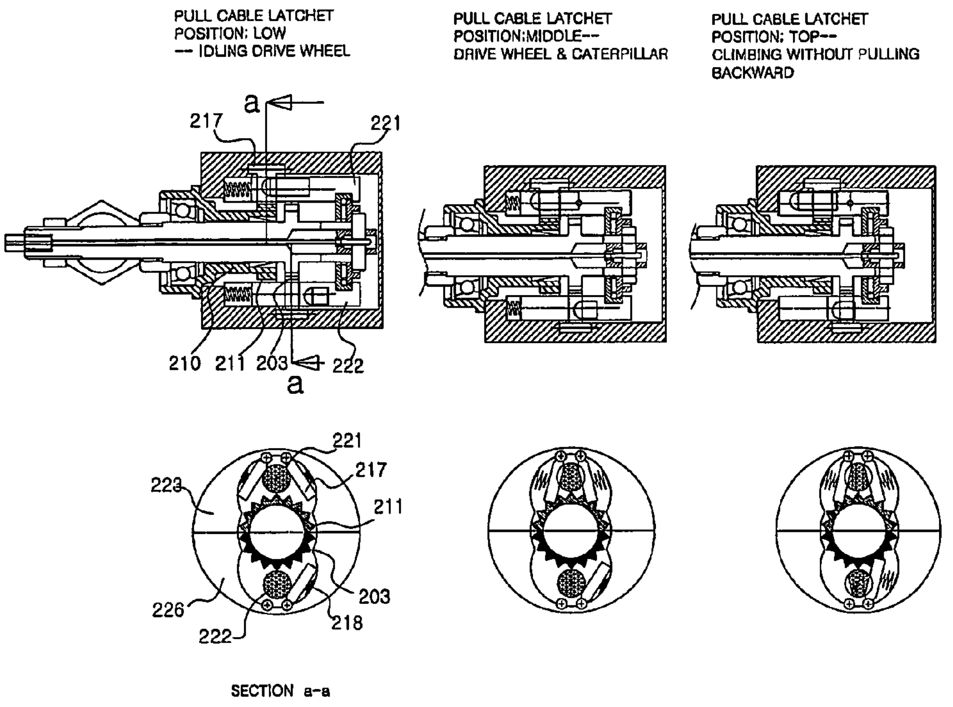
FIG. 6E illustrates operation of a ratchet clutch mounted with a wheel hub according to a preferred embodiment of the invention.
Figure 7A:
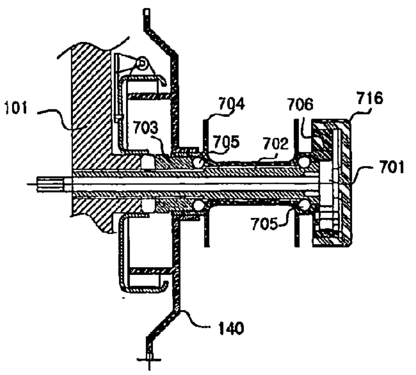
FIG. 7A is a sectional view of a ratchet clutch mounted with a wheel hub according to an alternative embodiment of the invention.
Figure 7B:
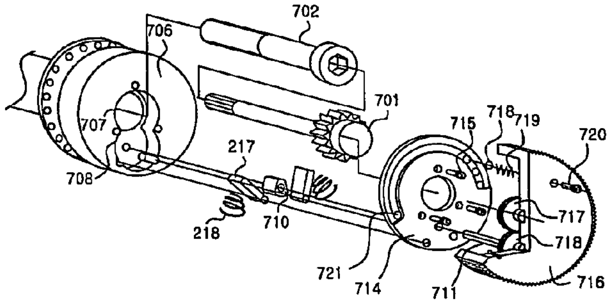
FIG. 7B is an exploded perspective view of a ratchet clutch mounted with a wheel hub according to an alternative embodiment of the invention.

As shown in FIG. 4, an alternative embodiment to the wheelchair construction comprises a chair frame of a laterally symmetric configuration for supporting front and rear wheels. The chair frame is integrally connected by a plurality of members 115, 116, 117, and 118 for laterally connecting and supporting front and rear axial portions and front and rear upper portions.

Hereinafter description will be made with reference to only a right section of the chair since parts are constructed in a laterally symmetric configuration. A caterpillar functioning as a front wheel comprises a plurality of cylindrical wheels 146, 147 and 148 having rotary shafts in their central portions and guide grooves in their peripheries so that at least one flexible belt 149 is wound around the wheels and the winding belt forms a obtuse triangle in which one of two sides having an obtuse exterior angle there between forms an approach angle with respect to the ground. And the caterpillar also comprises means for coupling the wheels to a front section of the chair frame in order to support the chair front frame on the ground, and a drive means for driving the rearmost wheel 146 of caterpillar so that the caterpillar can be driven by a pair of rear drive wheel to facilitate forward and backward movement of the wheelchair on rough road conditions.

In another alternative embodiment for supporting the caterpillar to the chair body, a support member 161 is provided to support the rotary shafts of the above wheels and a round shaft 162 is provided in a portion of the support member 161 parallel with the rotary shafts in order to prepare coupling means to chair body. A hollow boss 163 is provided for receiving the rotary shaft 162 through one end of the boss 163 in order to constitute a connection member for allowing the support member 161 to be coupled with the chair body frame 101 via the connection member. A rod member 164, a buffer spring 165 and a spring guide 166 are arranged perpendicularly to the rotary boss 163, and the rod member 164 is provided with anti-rotation means. A guide gutter 167 for receiving the rod member 164 is provided in a front lower portion in each of the left and right chair frame sections. The connection member is coupled with the chair frame 101 in a vertically movable manner via tightening means 168 to assemble the caterpillar to the chair body in a buffering fashion.

An auxiliary frame for supporting the caster to the chair frame is constituted as follows: Two rod members 123 and 124 of an equal length are provided with holes at one end 120 and at middle 135 each which are hinged at the middle holes to form a foldable first intermediate joint 135 in an X configuration. The other hinge holes are placed between the other end and the first intermediate joint 135 of the rod members 123 and 124 each, of which holes are joined with the one end of rod member 126 and 127 each. The other ends of the rod members 126 and 127 each are rotatably coupled with each other to form a second intermediate joint 136 so that rod members are connected at the four joints to form a four-lever-linkage which is symmetric with respect to the first and second intermediate joints. And another linkage is provided in an equal configuration and the two linkages are arranged parallel to each other at a predetermined distance, and hollow rod members 128 connect between the first intermediate joint and between the second intermediate joint. A pin member 129 is inserted in the hinge means which are placed at the one ends of the rod members of the X-shaped shafts of the linkages, and in the hinge means 105 and 106 which are provided in the left and right frame sections 101 and 102 of the foldable chair body so that the auxiliary frame can be folded along with the left and right chair frame sections with respect to the first and second intermediate joints as folding points. The lower end portions of the rod members of the auxiliary frame contact a lower frame of the chair and are supported thereto when the ones are in a spread position in the X-configuration. The first hinge shaft 409 of a knuckle cylinder 407 of the caster is coupled with the first intermediate joint 135, and a bent rod member 408, 410 in right angle is prepared, one 408 of which is received in a guide hole 413 formed in the caster and the other one is coupled with the second intermediate joint 136 so that the knuckle cylinder 407 of the caster is supported perpendicularly with respect to the chair body.

The lifting caster is constituted as follows: a cylindrical caster wheel with a central rotary shaft is supported by two-legged fork bracket with a round steering shaft 405 of which centerline is offset to the center of the above caster wheel and perpendicular against ground. A hollow cylinder 402 is provided to receive the steering shaft 405 inside and to guide a hollow knuckle cylinder 407 and a cylindrical spring 414 outside and to support hollow washers 403 and rolling bearings 404 at each end, and is coupled with the steering shaft by a fastening member 406 so that knuckle cylinder allowed for rotating around the steering shaft and sliding up and down under an elastic bounding force in an axial direction in the space between hollow washers 403. The steering shaft is supported by the rolling bearings 404 which allow the shaft to get free axial rotation. Another hollow cylindrical hole 413 having both open ends is formed parallel with the axial direction of the knuckle cylinder 407 of the caster steering shaft to receive a knuckle pin 408 so that the bottom of the caster knuckle cylinder 407 is coupled with the second intermediate joint of the auxiliary frame for supporting the caster. A rod 409 is installed perpendicularly in the cylindrical hole 413 of the knuckle cylinder to constitute the first hinge shaft 409, and inserted into and coupled with the intermediate joint 135 of the frame so that the vertical steering shaft of the caster is perpendicularly coupled with the auxiliary X frame 123 for supporting the caster and the frame is provided foldable.

Further, a flexible traction cable is prepared which comprises a flexible wire 412 and a hollow flexible tube 411 and the flexible wire guided through the center hole of the hollow flexible tube 411, and one end of the flexible tube is supported at one portion of the caster knuckle cylinder 407, and one end of a traction cable 412 is coupled with the cylindrical washer 403. When the other end of the traction cable 412 is coupled with a cable-hauling ratchet 250. When the cable-hauling ratchet 250 is hauled upward, the steering shaft 405 of the caster is moved upward for a axial distance while compressing a spring against the knuckle cylinder 407 which is supported by the auxiliary X frame 123, so that the caster 401 is detached from the ground and the caterpillar belt 149 touches the ground. In downward operation of the ratchet 250, a spring 414 push down the caster while detaching the caterpillar from the ground so that the caster supports the wheel chair against the ground. Then steering operation can be carried out easily with the caster.

Means for transmitting rotation force to the caterpillar are constituted as follows: The drive sprocket wheel 140 cooperating with the rear drive wheel 701 is axially supported in a rotatably fashion at the chair frame 101. The same chain sprocket wheel 142 and 143 are jointed on a boss which is supported rotatably on the low portion of chair frame 101, and flexible chain belt 141 winds around the sprocket wheels 140 and 142. And other sprocket wheel 145 is provided on the rearmost wheel 146 of caterpillar and flexible chain belt 144 winds around the sprocket wheels 143 and 145. The quantities of sprocket wheels each are arranged to get the same running speed on ground of caterpillar and rear drive wheel, as a result, rotating force of the rear drive is sequentially transmitted to the caterpillar 149 to move on the ground at the equal speed to the one of the rear drive wheel.

The hub clutch 201 for engaging/disengaging the drive wheel 701 with the sprocket wheel is constituted as follows: A cylindrical driving shaft member 208 is prepared which has a ratchet spur gear 203 is formed at a middle portion and threads at one end for coupling with chair body, and another thread at the other end providing means for coupling with a bearing 204, and two holes 205 of different sizes perforated successively in a central axial direction to receive a traction cable 240 and a cable holder 202, and two slit holes 206 which is symmetrically formed parallel to the center of the shaft at an outer peripheral portion in order to communicates with a hole 205. A cylindrical pin 207 is projected through above slit holes 206 and the cable holder 202 which is provided to move back and forth along the slit holes.

Further, a hollow cylindrical sprocket hub 210, which is installed at out race of hollow boss 210 for supporting cam cylinder block 215, is comprised with the drive sprocket wheel 140 at the periphery of one end and with the radial ratchet gear 211 at the other periphery of the other end is supported by the rolling bearings 213 and 214 which are installed at each end bores of the cylindrical sprocket hub 210 to prepare rotatable supporting means for drive wheel shaft 208, and a rolling bearing 212.

Further, a cam cylinder block 215, which is supported with rolling bearing 212 on the out race of the sprocket hub 210 and rolling bearing 204 combined with on the structural components 230, 226 and 236, is comprised with an axial central through hole for receiving the sprocket ratchet gear 211 therein, and with a plurality of guide grooves formed axially in the outer surface of the cylindrical block 215 to prepare for coupling with drive wheel hub 203, and with a hole 216 which is formed along a portion of a tooth width of the sprocket ratchet gear 211 at a distance from the central axis so that the central through hole is interfered and communicate with hole 216 to prepare a space for receiving ratchet arms 217 and elastic springs 218, and with two cylindrical axial holes 219 and 220 which are formed symmetrically spaced to a distance from each other about the centerline along with a portion of the length of cam shafts 221 and 222, and with two holes 223 which are formed in a communicating fashion with the hole 216 symmetrically with respect to the centerline to prepare pivot means of the ratchet arm 217 and with a plurality of fastening means 224 on a section of the boss.

And further, a plurality of ratchet arms 217, which is formed from rectangular plate members of a thickness with a round rod on in a rectangular plate members with a round rod on one edge of four ones protruding to a predetermined length in an axial direction from both sides, is pivoted on the holes 223. One plane of the plate member is supported by the elastic spring 218 to push the other plane against the cam shafts 221 and is arranged to be rotated to a portion of an angle according to the configuration of the cam so that the edge against to the pivot shaft of the plate member functions to engage/disengage with the ratchet gear.

A sprocket cam 221 and a shaft cam 222, which are formed of a couple of rod members with two planes 223 arranged symmetrically facing each other at an acute angle in a middle portion of a peripheral surface, are inserted into the holes 219 in the cylinder block 215 together with elastic springs 224, and the other ends of the cams having u-shaped notches are joined with a cam holder disc plate 225 having a plurality of quadrangular channel notches with radial open ends in a hollow disk member in the manner of prevent axial rotation of the cams 221 and 222. In axial shift of the cams, the ratchet arm 217 is converted at a predetermined angle from cylindrical-surface contact to plane contact to be engaged into the ratchet gear.

A disk cover 230, which is installed on the section of cylinder block to prepare a partition plate between the ratchet chamber of sprocket and the one of main shaft, is formed in a round disk shape with a hole at center for receiving the drive wheel shaft 208, and has a plurality of through holes 223 and 228 for receiving the sprocket cam 221, the shaft cam 222 and the pivot shaft of the ratchet arm 217 and a plurality of holes for allowing passage of a plurality of fastening means 231.

The shaft ratchet case 226, which is installed on the section of disk cover preparing a ratchet chamber of the main shaft, is comprised with an axial central through hole for receiving the shaft ratchet gear 203 therein, and with a hole 227 which is formed along a portion of a tooth width of the shaft ratchet gear 203 at a distance from the central axis so that the central through hole is interfered and communicate with hole 227 to prepare a space for receiving ratchet arms 217 and elastic springs 218, and with two cylindrical axial through holes 231 and 232 which are formed symmetrically spaced to a distance from each other about the centerline, and with two holes 223 which are formed in a communicating fashion with the hole 216 symmetrically with respect to the centerline to prepare pivot means of the ratchet arm 217, and with a plurality of fastening means 224.

And further, a plurality of ratchet arms 217, is pivoted on the holes 228. One plane of the ratchet arm 217 is supported by the elastic spring 218 to push the other plane against the cam shaft 222 and is arranged to be rotated to a portion of an angle according to the configuration of the cam so that the edge against to the pivot shaft of the plate member functions to engage/disengage with the ratchet gear.

A hollow disk-like bearing plate 235 contacts and supports the rolling thrust bearing 234 against rotating cam holder disk 225 to transport a force from the cable holder 202 which has a hollow cylindrical body and a through hole perforated perpendicularly to the axial direction thereof. The traction cable 240 is bonded to the cable holder 202 and extends through the holes 205 of the drive wheel shaft 208 to cooperate with the cable-hauling ratchet 250. The cylindrical pin 207 inserted perpendicularly through the holes 205 of the drive wheel shaft 208 and through the axial center of the cable holder 202 so that both ends of the cylindrical pin 207 projects through the drive wheel shaft 208, and presses down the bearing plate 235 to allow movement of the cams.

A cam cylinder cover 236, which is hollow cylindrical member with two holes 205 of different sizes perforated successively in a central axial direction to provide a space for cams and cam holder disk 225 and a rolling bearing 204 to support one end of cam cylinder block 215 on drive wheel shaft 208 and the other end on rolling bearing 212, and with a guide face for insertion of the drive wheel boss 203 and means for fastening a wheel hub clamping handle 237, and with a plurality of holes is provided in the other end of the periphery for coupling with the cam cylinder block via a fastening member 231. Further, the drive wheel hub 203, which is installed detachably on the cam cylinder block 215 and drive wheel shaft 208 by the wheel hub clamping handle 237, is made of a cylindrical hollow member with a plurality of guide grooves which are formed axially at a length in an inner peripheral portion at one end thereof in order to prepare coupling with the cam cylinder block 215 in a sliding fashion axially but not in a sliding one rotationally, and also with rims at each end which are provided means for connecting a drive wheel rim The cable-hauling ratchet 250 which serves to enable a user to directly control elevation of the caster and operation of the hub wheel clutch 201, is provided with a ratchet wheel 251 fixedly arranged on the chair frame, and is provided with a hollow control lever cooperates with at least one crank arm 252 which is rotating about a central shaft of the ratchet wheel and is provided to connect a plurality of control cable. A wire rod 254 is inserted into the control lever and connected rotatably with one end of the ratchet arm 253 which is hinged on a portion of the lever, and the other end of the wire rod which is connected with a push button 255 in an upper end of the lever 250 so that the push button 255 receives a repulsive force from an elastic spring 256. If the push button is pressed against the repulsive force, the ratchet arm 253 is disengaged from the gear to enable disengagement of the ratchet gear to release the lever 250 at any rotational angle. One ends of traction cables guided to a hollow flexible tube are connected with crank arm 252, and the other ends of the traction cables are connected with a rotary shaft of the caster in response to rotation of the control lever so as to axially lift the caster. This operation selectively allows the caterpillar or the caster contact on the ground. One end of the traction cable 240 is coupled with the cable holder 202 of the hub clutch 201 in order to move the clutch cam shafts 221 and 222 in response to rotation of the handle. In this manner, it is enabled to select drive modes such as a single drive mode of the drive wheel 701, a combined drive mode of the sprocket wheel 140 and the caterpillar, a combined drive and anti-reverse mode the sprocket wheel and the caterpillar and so on.

An alternative embodiment of the wheel hub clutch will be described as follows: A ratchet shaft 701, which is formed a ratchet gear at an end of shaft and a spline at the other end to be connected to a power transmission shaft. A hollow sleeve 702, which receives a shaft portion of the ratchet shaft inside and supports a drive wheel hub 704 rotatably with the roller bearings 705 at one end of the cylindrical periphery outside is coupled with and supported by a lower end of the chair frame to maintain the pinch between shafts and the bearings 705 at both ends of the wheel hub.

The drive wheel hub 704, which is installed on sleeve 702 with the roller bearings 705, is comprised with a flange 706 at one end. The flange 706 is comprised is comprised with an axial central through hole 707 for receiving the sprocket ratchet gear 701 therein, and with a hole 708 which is formed along a portion of a tooth width of the sprocket ratchet gear 701 at a distance from the central axis so that the central through hole is interfered and communicate with hole 707 to prepare a space for receiving ratchet arms 217 and elastic springs 218, and with two holes 223 which are formed in a communicating fashion with the hole 216 symmetrically with respect to the centerline to prepare pivot means of the ratchet arm 217.

A rod-shaped cam 710 has a section defined by two straight line connecting both ends of the two arcs, and rotatably coupled with a cam shaft 711 in the hole 708 of the flange. Ratchet arms 217 are arranged in parallel at both sides of the cam 710, a face of the ratchet arms parallel with the cam is rotatably supported. An elastic spring member 218 is provided outside the ratchet arms to act an elastic repulsive force toward the cam.

An arc portion or a planar portion of the cam is in contact with the ratchet arm according to a rotation angle of the cam, and the ratchet arms is engaged/disengaged with ratchet gear. A disk-like cover 714 having a plurality of holes receives one ends of rotary shafts in the ratchet shaft 701, the cam 710 and the ratchet arm 217, and is coupled with the flange 706 via a plurality of fastening means 715. For controlling rotation of the cam, a cylindrical handle 716 is provided with a peripheral rim and the outer cylindrical face of the hub flange 706 is inserted into the peripheral rim. A cylindrical gear 717 is fixedly coupled with the inside center of the cylindrical handle 716, and rotatably meshed with a cylindrical gear 718 fixedly coupled with the cam shaft 711. A ball 718, a spring, fastening means 720 are provided in the cover 714 or the flange 706 to impart a detent function in cooperation with a detent groove 721. As a result, based upon the feeling of a hand, the user can select rotation angle of the handle at a necessary position to transmit/interrupt a driving force and convert the rotation direction of the drive wheel.

A band brake is provided as follows: A hollow cylindrical brake drum 501 is arranged coaxially in one side of the drive sprocket wheel 140. A drum housing 504 is supported to the chair frame 101 by a stationary bracket 510. One end of a T-shaped crank lever 505 having a plurality of joints is rotatably coupled with one portion of the drum housing 504. The other end of the crank lever 505 is connected with one end of the brake band 503. A plurality of brackets 506 and 507 have a throat hole perforated therethrough, and are movably connected with and supported to a hinge pin extended through both sides of the crank lever via a slit. One end of the brake band is cooperatively coupled with the crank lever 502 and the other end thereof is supported by the drum housing to surround the brake drum. Traction cables 508 and 509 are connected with the brackets 506 and 507 which are movably coupled with the crank lever. Ends of the traction cables 508 and 509 are connected with brake handles 511 and 512 which are provided for the user and a carer. In operation of at least one of the handles, the brake band 503 generates a frictional force to the outer periphery of the brake drum 501 to interrupt rotation of the drive sprocket wheel 140.

An auxiliary power unit includes the motor 801 and the decelerator 802 are coupled with the chair frame 101 via fastening means, in which an output side of the decelerator 802 is coupled with the drive wheel shaft via spline means. At least one battery (not shown) is provided in a portion of the chair frame, and the driving levers 804 are provided adjacent to arm rests. Electric control signals are supplied to a controller (not shown) to actuate the motor with the battery so that the wheelchair can be driven.

Hereinafter description will be made about manual operation of the wheelchair of the invention having the above construction. When the user seated in the wheelchair rotates the cable-hauling ratchet 250 placed in the leading end of the wheelchair body to the lowermost position, tension in a traction cable 261 for lifting the caster is relieved to actuate the spring 414 of the caster so that the caster wheel moves down so that the wheelchair body and the caterpillar is lifted up against ground. As a result, the caster functions as a front wheel to enable smooth steering. And also in the lowermost position of the cable-hauling ratchet 250, tension in the traction cable 240 for controlling the ratchet cam is relieved so that the cam is moved to the rearmost position by the cam spring. Then, an arc of the cam 221 pushes the ratchet arm and is separated from the gear of the ratchet. The sprocket wheel boss, the wheel hub and the drive wheel can rotate freely without any interaction with one another so that the sprocket wheel and the caterpillar are not rotated even though the drive wheel is manually rotated. This enables the user to easily drive the wheelchair without energy loss. When the cable-hauling ratchet 250 is drawn to an intermediate position, the traction cable 261 for elevating the caster is hauled to lift the caster and the caterpillar contacts on the ground in a movable fashion. Tension in the traction cable 240 for controlling the ratchet cam causes the sprocket cam to move so that the sprocket ratchet arm is bonded to a planar portion of the cam via the elastic member 218 and engaged with the thread section of the ratchet 211. Then, as the sprocket wheel boss, the wheel hub and the drive wheel shaft cooperate with one another, manual rotation of the drive wheel enables cooperative rotation of the sprocket wheel and the drive wheel. When the user push the hand rim of the drive wheel, the drive sprocket 140 transmit rotating force to the all the sprocket wheels which are chained up with so that the rotating force is sequentially transmitted to the caterpillar 149 to move on the ground at the equal speed to the one of the rear drive wheel. Upon receiving a driving force on caterpillar, the caterpillar wheels advances along a guide track with an approach angle of the flexible belt between the ground and the upper end of the step, and contact an upper end of a obstacles on the ground in an advancing direction. This enables the wheelchair to readily pass over a partition block on the road, a depression in the ground such as a drain, and a gap between an entrance floor and a platform of an electric train. Pulling the cable-hauling ratchet 250 to the uppermost position moves the shaft ratchet cam 222 so that the ratchet arm adjacent to the shaft is coupled with the shaft ratchet 217 to restrain rotation to a direction. This prevents drive wheels from rolling rearward on a ramp to facilitate climbing inclines.

For the automatic operation of the wheelchair, the electric driving control levers 804 arranged around the arm rests are tilted by hand to turn the motor in a forward or reverse direction to actuate the rear drive wheels at a desired speed so that the left and right rear drive wheels are controlled to drive forward and reverse and lateral steering.

Also braking operation during movement on a downward will be described as follows: The caterpillar is selected to contact the ground, as well as one of the brake handles 512 which are mounted on the ends of the arm rests and the brake handles 511 mounted on carer's handles is pulled, then one of the traction cables 508 and 509 pulls the crank lever 505 to rotate around a fulcrum, of which one end is hinged rotatably on drum case 504 jointed on chair frame and the other end coupled with the brackets 506 and 507, so that one end of the brake band 503 which is supported to the drum housing 504 at the other end is hauled via link 502 to compress against the brake drum 501 thereby generating a resistant force. This decelerates rotation of the drive sprocket wheel 140 and thus braking operation can be successively operated.

While this invention has been described in connection with the preferred embodiments in the specification of the invention, it is also understood that various modifications and variations can be made without departing from the scope of the invention, which is not restricted to the above described embodiments but shall be defined by the appended claims and equivalents thereof.

INDUSTRIAL APPLICABILITY

According to the present invention as set forth above, the caterpillars are provided as front wheels so that a wheelchair rider can readily pass over a partition block on the road, a depression in the ground such as a drain, and a gap between an entrance floor and a platform of an electric train. The wheelchair rider can operate the drive wheels and separate the drive shafts by himself/herself to readily convert between manual and power modes thereby saving energy. Even though the rider detaches hands from the drive wheels during uphill climbing in a manual mode, the wheels are not rolled backward to enable safe and consecutive climbing. Also, the rider can intermittently brake the wheelchair through operation of the control handle during downhill descent. The detachable rear wheels makes it easy to load the wheelchair in a vehicle. Since the wheelchair of the invention allows the handicapped persons to pass over obstacles in indoor and outdoor roads, enlargement of the possibility of their participating activity in the society could be expected.

What is claimed is:

1. A foldable wheelchair comprising:

a foldable X-shared chair frame for having a seat on the X-shaped chair frame;

a pair of auxilary power units respectively having motors and decelerators at opposite rear portions of the foldable X-shaped chair frame;

a pair of drive wheels respectively having cylindrical hollow drive wheel hubs on the opposite rear portions of the foldable X-shaped chair frame;

a pair of wheel hub ratchet clutch devices respectively in the hollow drive wheel hubs for selectively engaging/disengaging the auxiliary power units with the drive wheel hubs and, thereby, the drive wheels;

a pair of caterpillars respectively on opposite front portions of the foldable X-shaped chair frame;

means for driving the caterpillars with the drive wheel hubs when the wheel hub ratchet clutch devices selectively engage the auxiliary power units with the drive wheel hubs, whereby to drive the foldable X-shaped chair frame with the drive wheels and caterpillars;

a caster wheel at a symmetric center of the front portion of the foldable X-shaped chair frame; and means for lowering the caster wheel from a position above the caterpillars to a position below the caterpillars, whereby to raise the caterpillars from the drive thereof.

2. A foldable wheelchair comprising:

a foldable X-shaped chair frame having a seat onto the X-shaped chair frame;

a pair of auxiliary power units, having motor (801) and decelerator (802) driven by auxiliary power source, mounted at a rear portion of the foldable x-shaped chair frame sections by fastening means;

a pair of drive wheels (701), having cylindrical hollow drive wheel hubs (203) with a plurality of guide grooves at a inside periphery, mounted rotationally about a rotational drive shaft driven by the auxiliary power unit, wherein the drive wheel hub coupled with the drive shaft by clutch means allowing the drive wheel to be driven selectively by manual force of a driver on the seat or by auxiliary power;

a pair of wheel hub ratchet clutch devices, mounted rotationally about a rotational drive shaft driven by the auxiliary power unit and coupled in a periphery of the drive wheel hub, allowing the auxiliary power units to be selectively engaged/disengaged with the drive wheels and wheel means driven by the drive wheel, further comprising;

a drive wheel shaft (208), having a ratchet gear (203) on outer periphery, coupled with a bore of the decelerator (802) of the auxiliary power unit;

a drive sprocket wheel (140), having sprockets on a periphery portion and a ratchet gear (211) on a outer periphery of a hollowed boss, mounted rotationally about the drive wheel shaft (208);

a cam cylinder block (215), having a plurality of guide grooves formed axially in a outer surface, and having a through hole at a central portion of the block and a couple of holes communicated with the through hole, supports the drive wheel shaft and the drive sprocket wheel rotatably;

a plurality of ratchet arms (217) pivoted on the cam cylinder block and a plurality of elastic springs (218);

a plurality of cam shafts (221, 222), having a cylindrical surface and a planar portion on peripheral surface and a couple of elastic springs (224), mounted through the holes of the cam cylinder block, wherein the cam shafts are movable in axial direction by a pushing force transmitted from a cable-hauling ratchet (250) 50 that the cylindrical surface or the planar portion of the cam shaft contact on the ratchet arm (217), enabling to engage/disengage the ratchet arms to the ratchet gears of the drive wheel shaft and the drive sprocket wheel, so as to selectively connect/disconnect the auxiliary power to the cam cylinder block and the drive sprocket wheel, and so a driver seated on the seat enables manual drive by himself after driving in auxiliary power driving mode selectively by push/pull the cable-hauling ratchet;

a pair of caterpillars mounted on a front section of the foldable chair frame, driven by the rotating force from the drive wheel at the same speed of the drive wheels against the ground, so that all the wheels of the wheel chair are rotated forcedly which enabling to increase inclining ability over obstacles or depressions on a road, further comprising;

a plurality of cylindrical wheels (146,147,148), having at least a groove on a periphery of the cylindrical wheel and a rotary shaft in the central portion of the cylindrical wheel, mounted on a front section of the foldable chair frame by fastening means;

a plurality of flexible belts (149) wound around a plurality of the cylindrical wheels along the grooves, of which linear sections between adjacent the wheels define at least a triangle with an approach angle in forward direction and;

a pair of sprocket wheels, mounted at a rear most the cylindrical wheel (146) of the caterpillars concentrically to the rotary shaft, is being driven by a plurality of flexible chains (141,144) transmitted from the drive sprocket wheel, and enables the caterpillars;

a pair of foldable auxiliary x frames, mounted on the chair frame allowing to support a caster wheel at an symmetric center of the foldable chair frame, further comprising;

a pair of a rod members (123,124) of an equal length hinged rotationally at a middle portion (135) forming X-configuration, of which upper ends are mounted on a upper portion of the chair frames (101,102) through hinge means so as to be foldable along with the chair frame;

a pair of a rod members (126,127) of an equal length coupled with each ends (136) rotationally by hinge means, of which opposite side ends are mounted rotationally on a portion of the rod members of X-configuration, forming symmetric four-lever-linkage which defines a couple of hinge(135,136) vertically arranged against the ground surface at the symmetric center of the foldable chair frame so as to be able to support a member joined with the couple of hinges vertically to the ground surface;

a lifting caster wheel, mounted on the auxiliary x-frame, enabling to lift up/down the chair frame and the caterpillars are lifted up/down so as to allowing the wheel chair to be driven by three wheels permitting easy steering operation or to climb up obstacles on a road, further comprising;

a caster wheel with a steering shaft member (405) mounted to be rotated and slide along the axis of the steering shaft through a hole of hollow cylinder (407), wherein the hollow cylinder is mounted on the hinges (135,136) of the symmetric four-lever-linkage through hinge means in a symmetric middle portion between the left/right foldable chair frame sections perpendicularly against ground surface;

a fixed shaft member (409) extended from a outer surface portion of the hollow cylinder (407) vertically to the axis of the hollow cylinder which is coupled rotationally on the one hinge (135) of the four-lever-linkage of the auxiliary x-frame;

a sliding shaft member (408) placed in a guide hole (413) of the hollow cylinder along the axis, having a shaft member (410) vertically to the axis of the hollow cylinder, wherein the shaft member (410) mounted rotationally on the one hinge (136) of the symmetric four-lever-linkage so as to the hollow cylinder support the caster wheel on the auxiliary x-frame perpendicularly against ground; and a spring member (414) placed between the steering shaft member (405) and the hollow cylinder, pushing down the caster wheel against the hollow cylinder, so that the chair frame and the caterpillars are lifted up so as to enable the wheel chair is driven by three wheels permitting easy steering operation;

a cable-hauling ratchet, having a pull/push handle (250) and stop /releasing ratchet device (253,254,256) mounted on the chair frame section, which enable to pull/push a cable linked to operate the cam shaft of the ratchet clutch device and the cable linked to the steering shaft member (405) by pulling/pushing the handle, so as to lift up the caster wheel to operate the caterpillars and the drive wheels.

* * * * *